United States Patent
Chang (10) Patent No.: US 8,621,206 B2
(45) Date of Patent: *Dec. 31, 2013

(54) AUTHORITY-NEUTRAL CERTIFICATION FOR MULTIPLE-AUTHORITY PKI ENVIRONMENTS

(75) Inventor: Kae-por F. Chang, Needham, MA (US)

(73) Assignee: Zoralco Fund Limited Liability Company, Dover, DE (US)

( * ) Notice: Subject to any disclaimer, the term of this patent is extended or adjusted under 35 U.S.C. 154(b) by 131 days.

This patent is subject to a terminal disclaimer.

(21) Appl. No.: 13/196,328

(22) Filed: Aug. 2, 2011

(65) Prior Publication Data

US 2012/0030460 A1    Feb. 2, 2012

Related U.S. Application Data

(63) Continuation of application No. 12/025,196, filed on Feb. 4, 2008, now Pat. No. 8,019,990, which is a continuation of application No. 10/228,784, filed on Aug. 26, 2002, now Pat. No. 7,328,344.

(60) Provisional application No. 60/325,835, filed on Sep. 28, 2001.

(51) Int. Cl.
*H04L 29/06* (2006.01)
*G06F 21/00* (2013.01)

(52) U.S. Cl.
USPC .......................................... 713/156; 713/168

(58) Field of Classification Search
None
See application file for complete search history.

(56) References Cited

U.S. PATENT DOCUMENTS

| | | | |
|---|---|---|---|
| 6,108,788 A | 8/2000 | Moses et al. |
| 6,134,550 A | 10/2000 | Van Oorschot et al. |
| 6,175,829 B1 | 1/2001 | Li et al. |
| 6,341,277 B1 | 1/2002 | Coden et al. |
| 6,484,258 B1 | 11/2002 | Haverty |
| 6,853,988 B1 | 2/2005 | Dickinson et al. |
| 7,165,092 B2 | 1/2007 | Chang et al. |
| 7,328,344 B2 | 2/2008 | Chang |
| 7,630,959 B2 | 12/2009 | Chang et al. |
| 2001/0011255 A1 | 8/2001 | Asay et al. |
| 2002/0069218 A1 | 6/2002 | Sull et al. |
| 2002/0108042 A1 | 8/2002 | Oka et al. |

OTHER PUBLICATIONS

"Certificate of Server" located at http://www.windowsitlibrary.com/Content/405/17/to.html, 1999.
"RSA Keon Ready Implementation Guide for PKI . . . " located at http://rsasecurity.agora.com/rsasecured/guides/keonca_pdfs/Microsoft_InternetExplorer_Keon.pdf, 2001.
"RSA Security Ships RSA Keon" located at http://www.rsa.com/press_release.aspx?id=906, 2001.

*Primary Examiner* — Gilberto Barron, Jr.
*Assistant Examiner* — Simon Kanaan
(74) *Attorney, Agent, or Firm* — Wolff & Samson PC (57) ABSTRACT

A method for facilitating electronic certification, and systems for use therewith, are presented in the context of public key encryption infrastructures. Some aspects of the invention provide methods for facilitating electronic certification using authority-neutral service requests sent by an application, which are then formatted by a server comprising a middleware that can convert the authority-neutral request into certification authority specific objects. The server and middleware then return a response from a selected certification authority back to the service requesting application. Thus, the server and/or middleware act as intermediaries that facilitate user transactions in an environment having multiple certification authorities without undue burden on the applications or the expense and reliability problems associated therewith.

15 Claims, 11 Drawing Sheets

AUTHORITY-NEUTRAL CERTIFICATION FOR MULTIPLE-AUTHORITY PKI ENVIRONMENTS

CROSS REFERENCE TO RELATED APPLICATIONS

This application is a continuation of U.S. patent application Ser. No. 12/025,196, filed on Feb. 4, 2008, which is a continuation of U.S. patent application Ser. No. 10/228,784, filed on Aug. 26, 2002, now U.S. Pat. No. 7,328,344, which claimed the benefit of U.S. Provisional Patent Application Ser. No. 60/325,835, filed on Sep. 28, 2001, all of which are hereby incorporated by reference in their entirety.

BACKGROUND

The present invention relates generally to methods for digital certification, and more particularly, to software applications that perform secure transactions in a public key infrastructure (PKI) environment having a plurality of certification authorities.

Technological advances and legislative requirements in encryption, digital certification, and electronic signatures have presented both opportunities and challenges for business and government entities wishing to conduct transactions securely over communications networks such as the Internet. Several standards and protocols have been developed and are being developed for use in such applications. Public key infrastructure (PKI) is one security infrastructure designed for use with the Internet that provides a framework for managing digital certificates and their associated public/private key pairs. Public key cryptography is normally associated with asymmetric cryptography. However, PKI can utilize elements of both asymmetric and symmetric cryptography, whose nature is known to those skilled in the art. The terms public key cryptography and asymmetric cryptography are used interchangeably in the present application.

PKI provides several encryption and security services, which are generally grouped under the categories of confidentiality, authentication, integrity and non-repudiation.

"Confidentiality" is the protection of data against unauthorized access or disclosure, and prevents those to whom a transmission was not intended from accessing the information within the transmission.

"Authentication" is the verification of a party's identity or the verification of the source of information. Authentication can be achieved by use of passwords, keys, or other means for recognition.

"Integrity" is the protection of data against unauthorized modification or substitution to information. This service is usually provided by cryptography mechanisms called message authentication codes (MAC) or digital signatures.

"Non-repudiation" is the combined services of authentication and integrity that is provable to a third party. The goal of non-repudiation is to prevent an originator of a message from denying having originated the message.

These services are explained in more detail, for example, in the book PKI by Tom Austin, John Wiley & Sons, Inc., 2001, which is hereby incorporated by reference.

Thus, unlike the situation used in symmetric encryption techniques, wherein identical keys are used to encrypt and decrypt, public key encryption or asymmetric encryption techniques use a public key to encrypt the information and a different corresponding private key to decrypt the information. Public key encryption techniques provide certain features not available in symmetric encryption, including the ability to ensure non-repudiation, as discussed above.

Public key encryption systems require key management capabilities. Key management, sometimes referred to as key "life cycle" management, generally comprises the following phases: "key generation," referring to the process of initially creating the keys; "key distribution," referring to the movement of keys from one location to another; "key storage," referring to storing cryptographic keys following key distribution, in preparation for actually using the keys; "key usage," referring to the actual use of a key in a cryptographic application or transaction; "key recovery," referring to backing up keys, for reasons of reconstituting a cryptographic key due to hardware or software failure or loss of authorized access control; "key termination," referring to the point when a key has reached the end of its life cycle, either due to a predetermined validity period (such as expiration) or a suspected or known compromise; and "key archival," which refers to retention of a copy of a key which has been terminated, placing the key in secure storage for the purpose of validating data that was previously protected by that key. These aspects of a key's life cycle are explained in more detail by, e.g., Austin, cited above.

An application conducting a secure transaction does so by using its own digital identity in association with data transmitted by the application to authenticate a transaction. Similarly, an authentication process is used to receive and decode secure data. This authentication is accomplished using a digital certificate to identify a document along with the corresponding application. To prevent misuse of digital certificates, a digital certificate requires validation. Validation of digital certificates is done by certification authorities (CAs).

Trusted nodes in a network function as key distributors and administrators. Certification authorities act as trusted nodes in CA public key architectures. One function of certification is to ensure that a sender's public key does indeed belong to that sender, and not to some other imposter. Since a sender cannot sign its own public key in the same way that it may use its private key to generate a digital signature, a third party needs to independently certify that the sender is who he or she claims to be. The CA serves as this independent third party, and processes public key certificates. The CA provides security services not only to its subscribers, but also to other parties having secure transactions with the subscribers. The other parties may use the CA for services such as non-repudiation of transmissions from the subscribers, and hence the other parties are sometimes referred to as "relying parties."

A certification authority generates digital certificates, or "certificates," for use by applications in conducting secure communications. One aspect of digital certificates is that they carry an expiration date, to avoid use of a certificate indefinitely, perhaps to a date exceeding that at which the user is no longer privileged to use the certificate. Furthermore, CA-issued certificates are checked against a certificate revocation list (CRL). The CRL contains certificate information identifying certificates which have not yet expired, but are not to be honored. Certification authorities maintain certificate revocation lists (CRLs) for checking each digital certificate. A CRL is posted and updated about once a day to minimize unauthorized use of revoked certificates.

Entities such as government agencies or businesses conducting electronic business or online transactions may use computer applications designed for handling digital certificates. Such applications include virtual private networking products, e-mail systems, Web browsers and Web servers, Web applications such as changing addresses with government agencies and private sectors, among others. Each of these applications generally includes an application-specific protocol and/or application program interface API for handling digital certificates. An API is defined on Webopedia (www.webopedia.com) as "a set of routines, protocols, and tools for building software applications."

With the proliferation of nodes and users and agencies associated therewith, more than one CA exist to service the resulting needs. Transactions in the presence of multiple CAs present challenges, especially when transactions are to be conducted between two entities using different CAs. The difficulties that arise are in part due to the fact that the applications need to bear the burden of possessing cross referencing capabilities amongst different CAs in order to confirm the validity of the digital certificates being presented.

Unfortunately, different PKI vendors and CAs provide proprietary APIs, requiring applications based on PKI to take each vendor's specification into account when designing the application. This results in cumbersome and possibly ineffective applications, as an application using PKI would require constant updating to ensure that the most recent version of the application supports all of the standard PKI implementations available from the various PKI vendors.

In addition, the modifications, or changes to existing CAs or the addition of new CAs to a multiple-CA environment, may require costly and unreliable upgrades or modifications to the application environment including both the server and the application sides. Because the information on a digital certificate is public and can be viewed by anyone, an improved user registration system is proposed to enhance a digital certificate holders' capabilities to manage his/her private information associated with his/her identity in the context of PKI systems.

The recently-developed Open Certificate Status Protocol (OCSP) improves on the existing CRL revocation model by permitting effectively real-time revocation list updating, whereas the CRL model updated the revocation lists approximately on a daily basis. This aspect of OCSP improves security and reduces fraud. However, OCSP requires each application support the OCSP request format for each certification authority whose services might be required. Currently, the various software applications supporting PKI formulate their own OCSP requests and then send those to the CAs, requiring continuous updates and version distribution. Furthermore, the individual data fields provided in a digital certification are currently distributed and shared indiscriminately to any CA through which a transaction is being conducted. Users are currently unable to selectively share particular information with different CAs. This could lead to distribution of user information to entities with which the user would not otherwise wish to share information, and in itself presents a privacy issue that digital certification was in part intended to address.

SUMMARY

In one embodiment, the present invention solves the problem of requiring applications supporting the PKI to be continuously updated to support various protocols and request formats of the various PKI vendors.

In some embodiments, the invention provides a way to remove the burden of formulating the OCSP request from the application itself. Thus, according to one specific embodiment of the invention, a method for performing authentication is provided wherein applications are not bound to any particular CA format or architecture. In addition to solving these problems, some embodiments of the invention would allow users to choose between any of a plurality available CA providers who may have issued the user a digital certificate.

Another embodiment of the invention further provides for value-added services such as digital certificate registration service and advertising or notification features. Yet another embodiment of the invention additionally allows for user account management, and customized flexible delivery sets of data fields, to be given to different entities in the CA environment.

In other embodiments, a "post" method is used for sending certificates without caching. This allows for development of client applications which are not bound to a particular architecture, but rather interact via HTTPS through a "middleware" component, which itself formulates the OCSP request for delivery to the CAs. Thus, rather than requiring each application to support numerous APIs, each API conforming to a distinct CRL or CA format, the present system provides, in some embodiments, for an application which communicates through the middleware with the CAs. By so doing, applications may operate in an open CA environment, using a request and response model instead of using direct sockets. Accordingly:

One embodiment is directed to a method for facilitating electronic certification, comprising: receiving, on a server, a service request from a application, the service request containing public key encryption data; based on information contained in the service request, selecting a certification authority, from a plurality of available certification authorities; generating a data object including information associated with the information in the service request; transmitting the data object from the server to the selected certification authority; receiving, on the server, a response from the selected certification authority; generating a response object including information associated with information contained in the response; and transmitting the response object to the application.

Another embodiment is directed to a system for facilitating electronic certification in a public key infrastructure (PKI), comprising: a server connecting an application with a PKI certification authority; and middleware, implemented on the server, the middleware comprising: a responder for responding to a service request received from the application; a dispatcher for routing communication through the server; a selector for selecting a certification authority from among a plurality of available certification authorities based on the service request; and a certification service request formatter corresponding to the selected certification authority.

DETAILED DESCRIPTION OF EMBODIMENTS

Requiring end users and administrators to install and maintain customized software provided by various PKI vendors is costly and inefficient. According to some embodiments, the present invention uses a PKI in a multiple-CA environment with a "thin" client, which eliminates the costs and effort of maintaining software on the end users' machines. By a thin client it is meant a client burdened with a minimal amount of processing, the server then carrying the majority share of the processing. In some situations, a system is provided that utilizes a browser-based interface to transfer/administer certificates for both end users and administrators, which achieves the previously-mentioned goals and permits rapid accommodation of many end users at a lower cost. Accordingly, some embodiments do not require proprietary upgrades or plug-ins to be installed, configured or downloaded.

According to some embodiments, the architecture is web-based rather than client-server based. Thus, the invention may be highly scalable, and allows for a virtually unlimited number of end users and certificates to be supported.

According to other embodiments, a software interface is provided which is hypertext markup language (HTML)-based and which therefore allows for flexible and rapid development. This Web-based capability allows for providing customers with service under an application service provider (ASP) model and is compatible with (secure) hypertext transfer protocol HTTPS. HTTPS, also referred to as S-HTTP, is a protocol for transmitting data securely over the World Wide Web. HTTPS is distinguished over secure sockets layer (SSL) in that it transmits individual packets of data or messages securely over the Web rather than attempting to establish a secure connection, as done with SSL.

According to other embodiments, the system may be constructed using a distributed platform, which may distribute data and the processing of data over a plurality of components, which may be part of a network. This architecture could provide for high availability and reliability with minimal interruption in service for the end users. Specifically, various embodiments are implemented using enterprise servers operating in a master-slave mode with a variety of connected computers, some of which are in a standby mode.

In yet other embodiments, a modular system is provided, and components are divided between the servers and external storage arrays. The servers may be used by the administrator for management, maintenance and routine operations.

A process is provided according to one embodiment described herein which comprises: customer enrollment; authentication of the customer and certificate status checking; signature verification; and certificate life-cycle management.

By "customer enrollment" it is meant any method for identity verification and proofing. In some embodiments, these may be in the form of Web-based enrollment through a registration authority (RA), or in the form of out-of-band enrollment.

According to some embodiments which use an ASP environment, authentication and status checking allows customers to enter a participating agency's Web site by first being authenticated by a Web server prior to entry, and then be authenticated on a recurring basis thereafter. The Web server may be configured to require customers to submit digital certificates with their signatures and to compare the CA signature with a list of authorized signing CAs stored in a database. Another aspect in authenticating the customers' digital certificates includes checking a certificate's status and whether the certificate remains valid, or has otherwise been revoked or suspended. According to some embodiments, certificate attributes are stored as objects in a database or a directory.

Several methods for managing certificate status are available according to the present invention, and include: the CA individually validating all certificates in real-time over a secure online channel and serving certificate status information to a reliant application on the Internet at the time that a transaction occurs; using online certificate status protocol (OCSP) for status checking; and checking Certificate Revocation Lists (CRLs). A discussion of these subjects and related embodiments can be found in U.S. Provisional Application Ser. No. 60/325,835, which is hereby incorporated by reference in its entirety.

One advantage of real-time status validation is that it eliminates the liability of CRLs, which may be compromised by latency of information in the case where a CRL predates a revoked certificate. By performing real-time certificate status checking, this problem is overcome. However, for those applications which rely upon CRLs, the present system can support CRL generation and distribution.

Because customers and users are required to submit electronic signatures in many secure online transactions, it is important to ensure non-repudiation of the signature. Additionally, an object may be required to have multiple signatures presented by multiple entities. Hence, a signing tool is provided for use with some embodiments of the present system that adheres to a public key cryptography standard (PKCS). A certificate management tool is provided in the form of a browser plug-in or Java applet for use by the end users. This is coupled to a corresponding server-side application for verifying the signatures.

Figure 1:
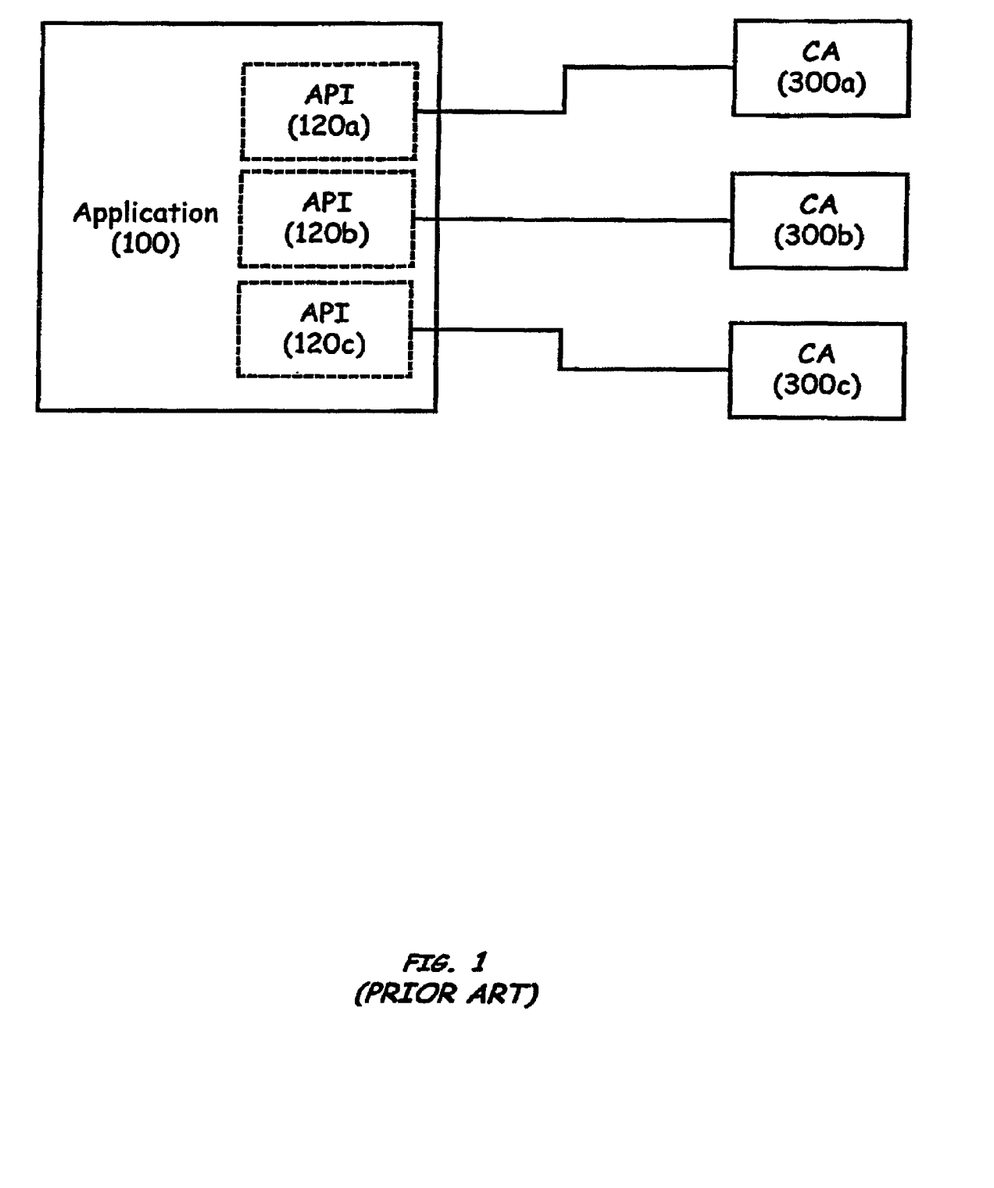
FIG. 1 is a schematic diagram of APIs connecting an application to a plurality of certification authorities according to the prior art.

Referring now to FIG. 1, a system is shown for conducting transactions with multiple CAs, according to the prior art. An application 100, which may have installed thereon a plurality of APIs 120, dedicates a specialized API 120 to a corresponding CA 300. That is, for each different CA, e.g., 300*a*, a unique corresponding API, e.g., 120*a* is installed onto the application 100. This scenario is not ideal, and entails the disadvantages recited previously. As an example, for each newly-established CA 300, a new specialized application interface or API 120 is needed to be installed. Likewise, each time a particular CA implements a change or updates its services, the corresponding API 120 might need to be replaced or updated. This creates an expensive and tedious and unreliable situation. Furthermore, the application 100 has little or no control over the software modules or APIs 120 which are required to be installed on the application 100 for compatibility purposes with each CA 300.

Figure 2:
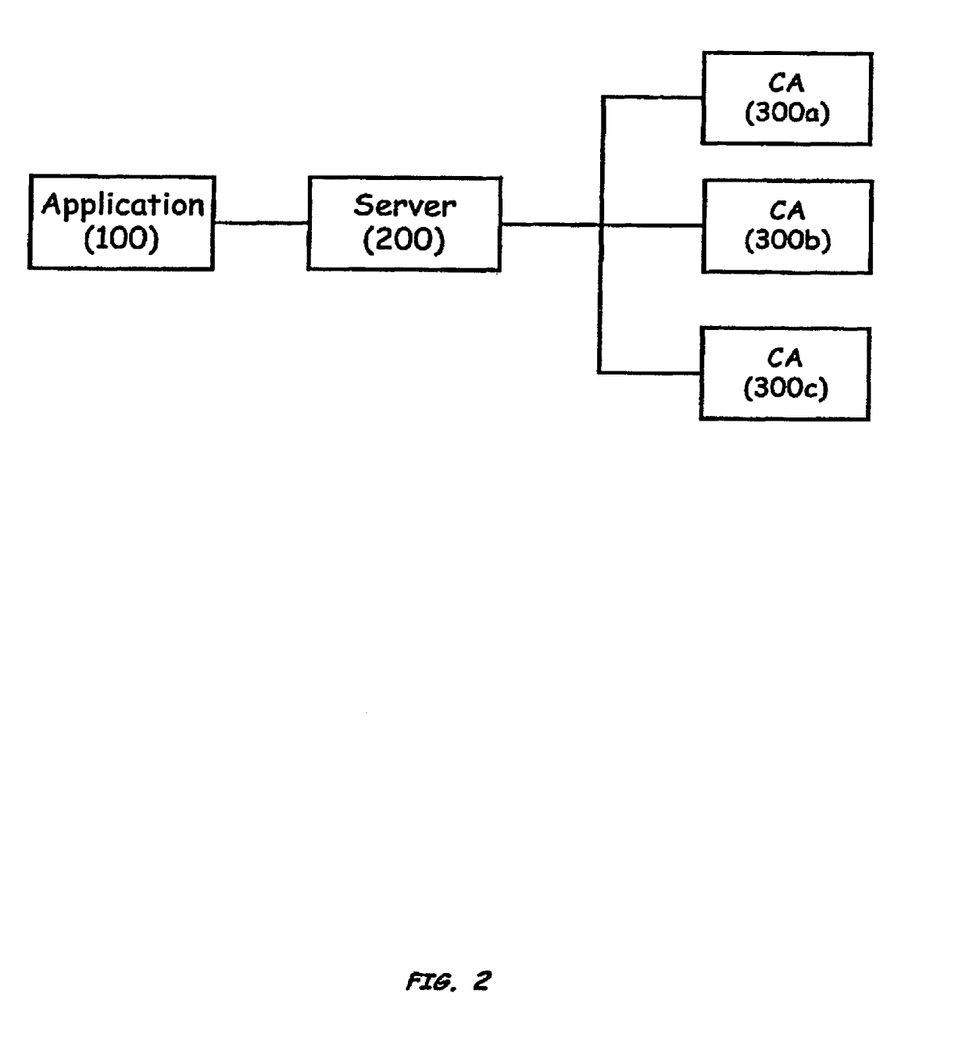
FIG. 2 is a schematic diagram of an embodiment showing a simplified connection between an application and a plurality of certification authorities, coupled by a server.

FIG. 2 shows a block diagram of an embodiment of the present invention whereby an application 100 is coupled via a server 200 to multiple CAs 300*a-c*. The application 100 transmits and receives service requests which are handled and appropriately formatted and routed by software on the server 200 to the appropriate CA 300. The server 200 may have a variety of software modules and/or hardware modules implemented thereon and adapted for processing communication signals between the server 200 and the application 100 as well as between the server 200 and various CAs 300 or other agents thereof.

The communication between the server 200 and the application 100 and the communications between the server 200 and the CAs 300 may be implemented in one or more of numerous forms known to those skilled in the art. For example, the communications may be passed over wire, cable, fiber optic, wireless, or other suitable channels. The Internet may also serve as a communication infrastructure, as may commercial broadcast or dedicated communication pathways which can be adapted for this purpose. In addition, more than one medium for communicating communication signals may be used in a single path line. A signal sent from the server 200 to the application 100, for example, may be first carried over a local area network (LAN), followed by a segment of telephone communication line, followed by a wireless transmission channel.

Figure 3:
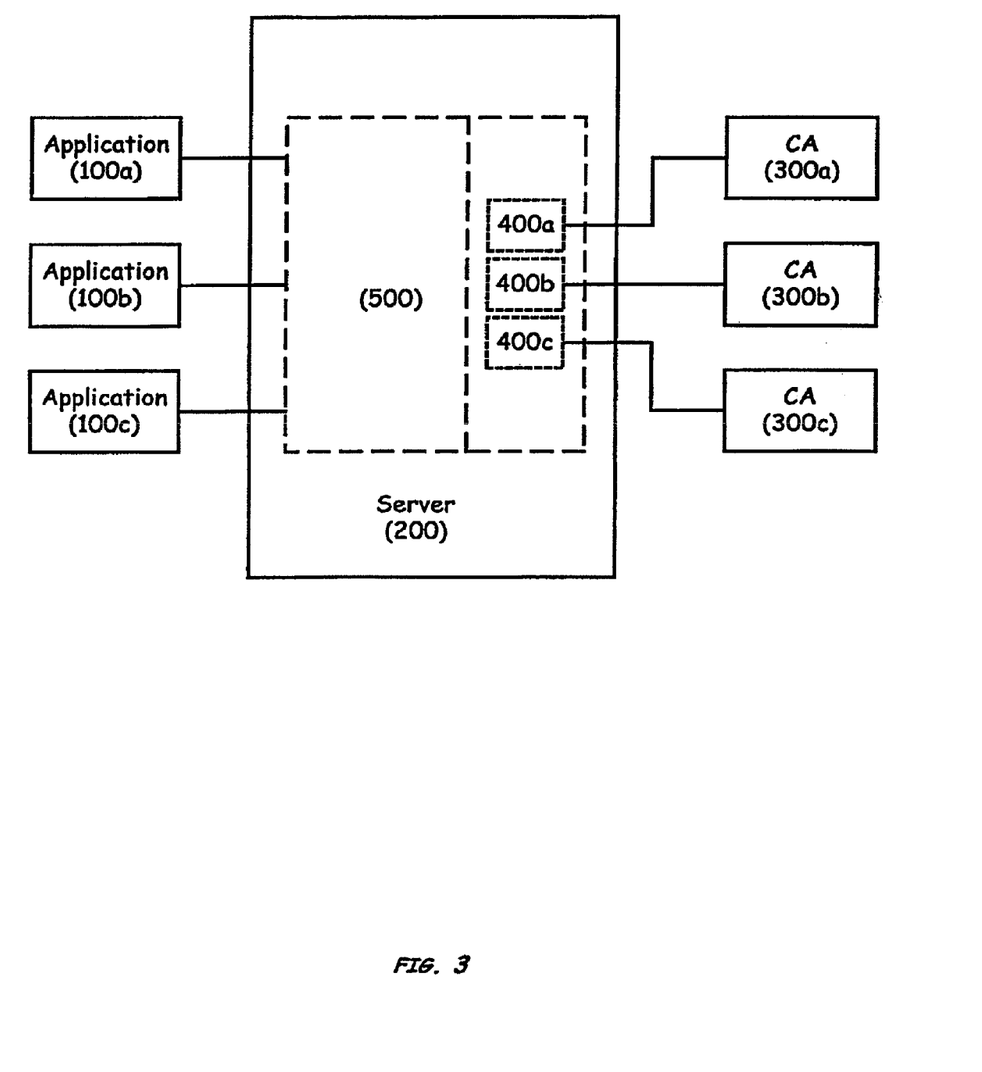
FIG. 3 is a schematic diagram of an embodiment showing a server having middleware and middleware components, coupling a plurality of applications to a plurality of certification authorities.

FIG. 3 shows a number of applications 100a-c, which may be running on a client machine, coupled to a server 200. The server 200 is in turn coupled to more than one CA 300a-c. The details of the interconnection of the applications 100 and the CAs 300 to the server 200 are not meant to be literal, but rather illustrative of the relative or logical positions of the applications 100 and the CAs 300 with respect to the server 300. In FIG. 3, an exemplary embodiment is shown, wherein a middleware 500 module, implemented in software, is installed on the server 200. The middleware 500 might comprise a request constructor 400. The request constructor 400 is coupled to the CAs 300 over a network or channel. The middleware 500 is typically adapted for processing communication to and from the applications 100 as well as to and from the CAs 300. The middleware 500 serves as an intermediary, adapted for performing computations or logical operations or data transmission and formatting, as well as other functions where necessary. In some embodiments, the server 200 is to be considered an authentication middleware server.

Figure 4:
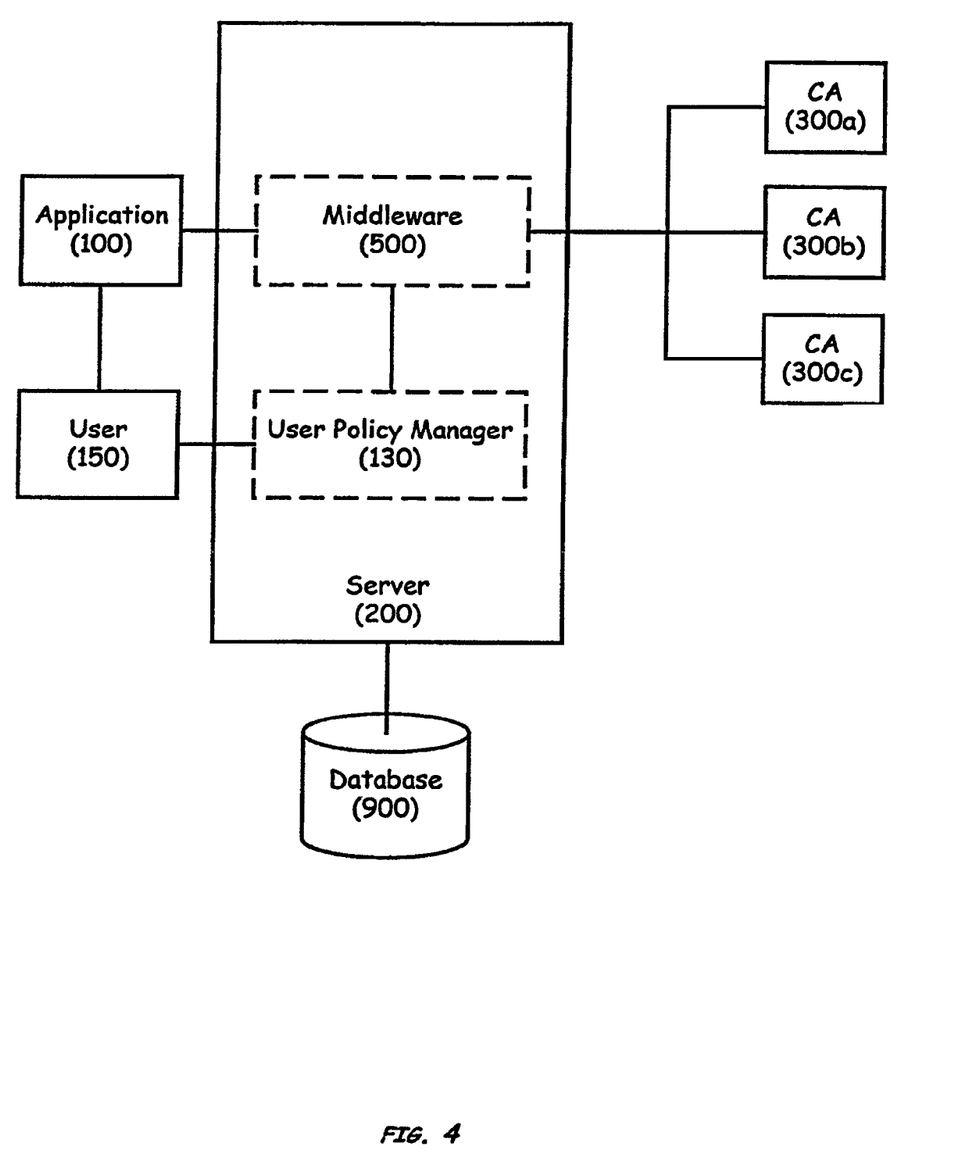
FIG. 4 is a schematic diagram of an embodiment showing a server, middleware, and policy manager, coupled to outside components.

FIG. 4 shows an embodiment wherein an application 100 and a user 150 using the application are coupled to the server 200. The server comprises middleware 500, which can process both application and user service requests and communications, and a user policy manager 130, which manages the user accounts. The middleware 500 in some cases carries out substantially all functions of the server 200, and is not limited to those component functions shown.

The user policy manager 130 may be specially adapted for communicating with the user 150 for processing and managing user updates and edits to the user 150 account. A user 150 may establish an account with the server 200 that includes user information which is stored on a database 900 coupled to the server 200. The user account information may include preference information and other security information which may be categorized in any logical way to facilitate maintenance of the user account information.

The user policy manager 130 may include flexibility allowing a user 150 to edit the user account information and update the information as required, preferably by an Internet or World Wide Web connection interface. The user policy manager 130 may request user authentication or login information prior to allowing the user 150 to access or edit the user account information. Both the middleware 500 and the user policy manager 130 may be stored in memory onboard the server 200, or they may implemented separately in separate memories on separate machines, which can be coupled to one another for the purpose of conducting user transactions and other tasks.

A plurality of CAs 300a-c are coupled to the server 200 as previously described. The interconnections between user 150, application 100, server 200, database 900, and the CAs 300 may be accomplished using any known networking system, including Ethernet and wireless connections.

The server 200 and the middleware 500 serve two-way communication and processing functions. In addition to requests and communications originated by the application 100 and the user 150, the CAs 300 also originate responses and communication information, which is to be processed and passed back to the application 100. The server 200 may be coupled to other auxiliary components, databases or communication systems, some of which are known to those skilled in the art and others are described herein. Such auxiliary components may be implemented in hardware or software, and may be included within the server 200 or within the middleware 500, or may be used as external components, possibly over a computer or other communication network.

Figure 5:
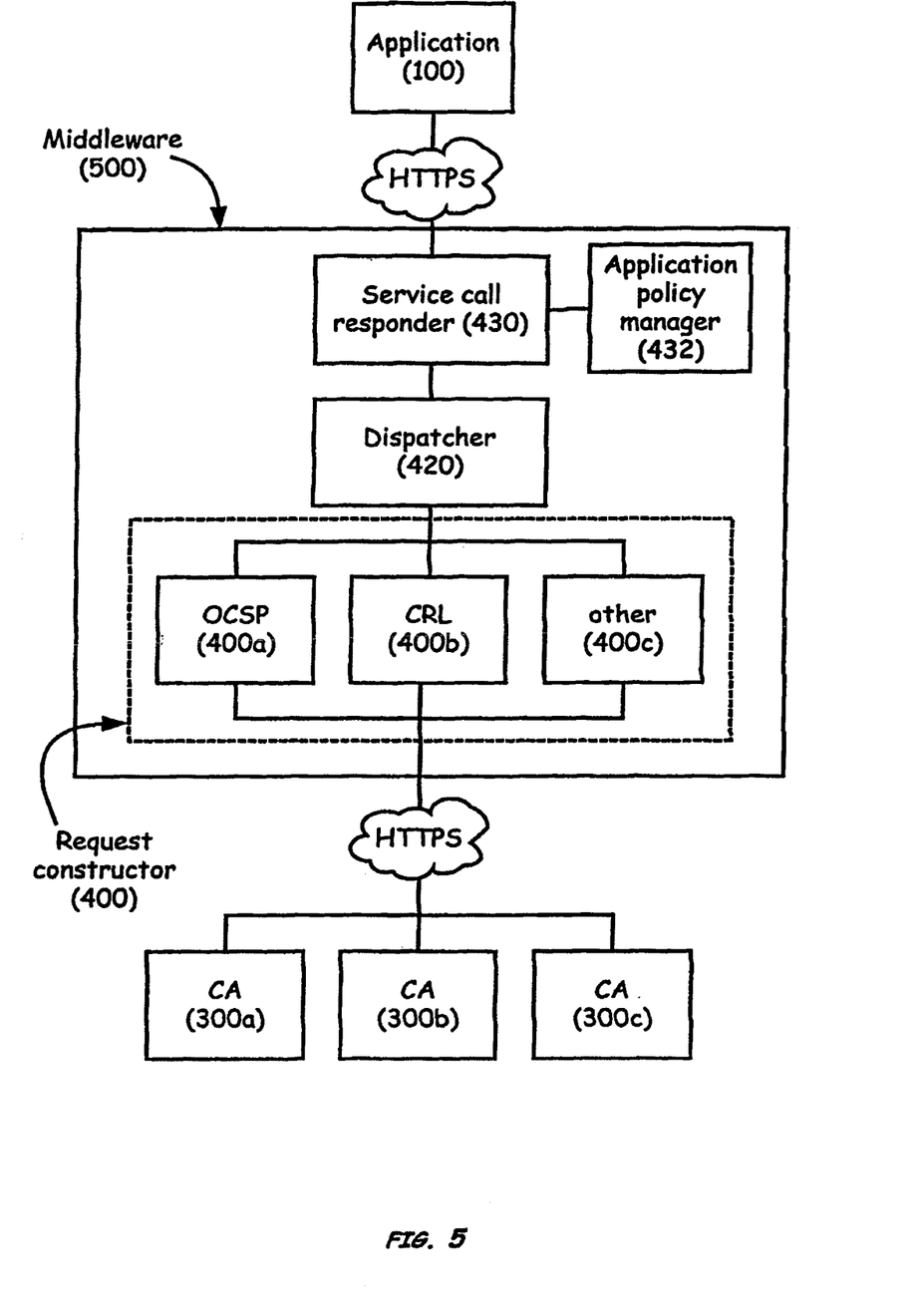
FIG. 5 is a schematic diagram of an embodiment showing an illustrative breakdown of some middleware components.

FIG. 5 shows an embodiment of the middleware 500 as it relates to some external components, shown as a block diagram. An application 100 is coupled to the system via a secure HTTPS connection. The application 100 and the middleware 500 communicate using a module in the middleware 500 called a service call responder 430. The service call responder 430 is adapted for receiving and transmitting communications to the application 100. These communications may be in an ordinary standard format or may be specially formulated in a proprietary format which both the middleware 500 and the application 100 support. Service request objects may be passed from the application 100 to the middleware 500 as packets of data accompanying or attached to communication traffic between the application 100 and the service call responder 430. It should be noted that in some embodiments the use of the HTTPS protocol avoids complications arising from the presence of fire walls as is known to those skilled in the art of data communication.

The application policy manager 432 is a software module that manages various aspects relating to applications 100 that use the functionality of the server 200 or middleware 500. The application policy manager 432 allows an application 100 itself to determine how digital certificates will be accepted from CAs. The application 100 can decide to accept all or some of the certificates. Additionally, the application 100 may grant the holders of digital certificates different levels of privileges based on the CAs 300 issuing the certificates or the class of the certificates, etc.

The service call responder 430 relays service call requests from the application 100 to the dispatcher 420. The dispatcher 420 performs a host of functions which can include: checking a digital certificate against a disabled certificate database; routing a request, such as an OCSP request object, to a selected CA that issued the digital certificate; receiving responses, such as OCSP response objects, returned by the selected CA; and routing response objects back to the application 100. A request constructor 400 is used to interface the middleware 500 to the CAs 300. This is accomplished in one embodiment by providing a request constructor module, such as OCSP module 400a, CRL module 400b or other modules 400c that then format and package the request objects and receive the responses from the selected CAs. The request constructor 400 and/or the middleware 500 may use an HTTPS connection to communicate with the CAs 300a-c.

This type of connection may provide some of the advantages described above with regards to packet transportation and facilitation of communication through a fire wall.

Of course the detailed implementation of the various modules of the middleware 500 may be achieved in many ways. Each of the described modules, such as the service call responder 430, the application policy manager 432, the dispatcher 420, and the request constructor 400, may involve sub-modules themselves, or may be implemented in one module, depending on the application and the architecture employed.

Figure 6:
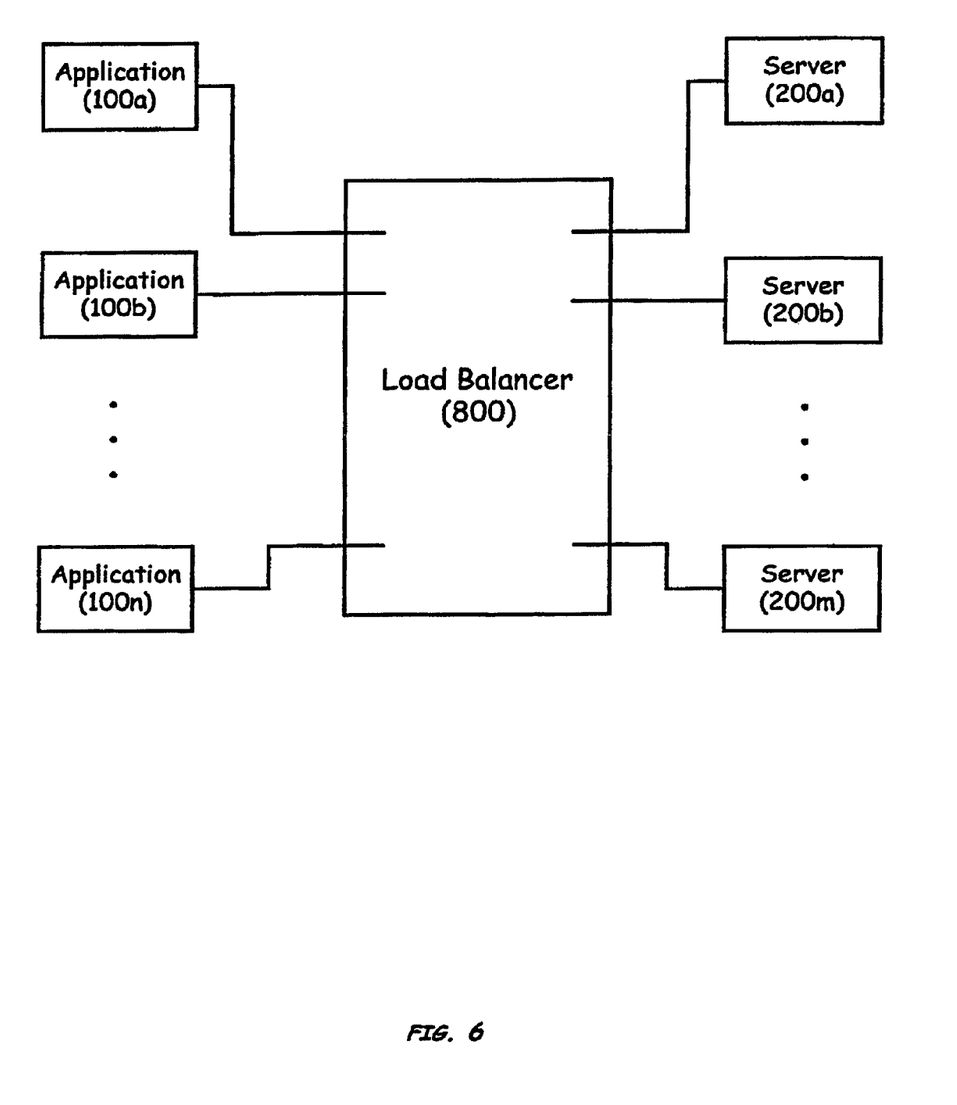
FIG. 6 is a schematic diagram of an embodiment showing a plurality of applications coupled to a plurality of servers through a load balancer.

Sometimes a large number of applications 100a-n may be requesting services from one or more servers 200a-m. In this case, a load balancer 800 may be implemented between the applications 100 and the servers 200 for the purpose of balancing the request call and response message load between the plurality of servers 200.

FIG. 6 shows a load balancer 800 disposed between a group of applications 100 and servers 200. The number of applications 100 and the number of servers 200 are normally not the same, and a single server can typically handle numerous applications 100 adequately. However, geographic or network considerations or other design considerations can make a load balancer 800 used as described above, advantageous. For example, the load balancer 800 may prevent a large number of applications 100 from overloading a particular server 200 during heavy use times or in geographic or network regions which are locally congested.

Figure 7:
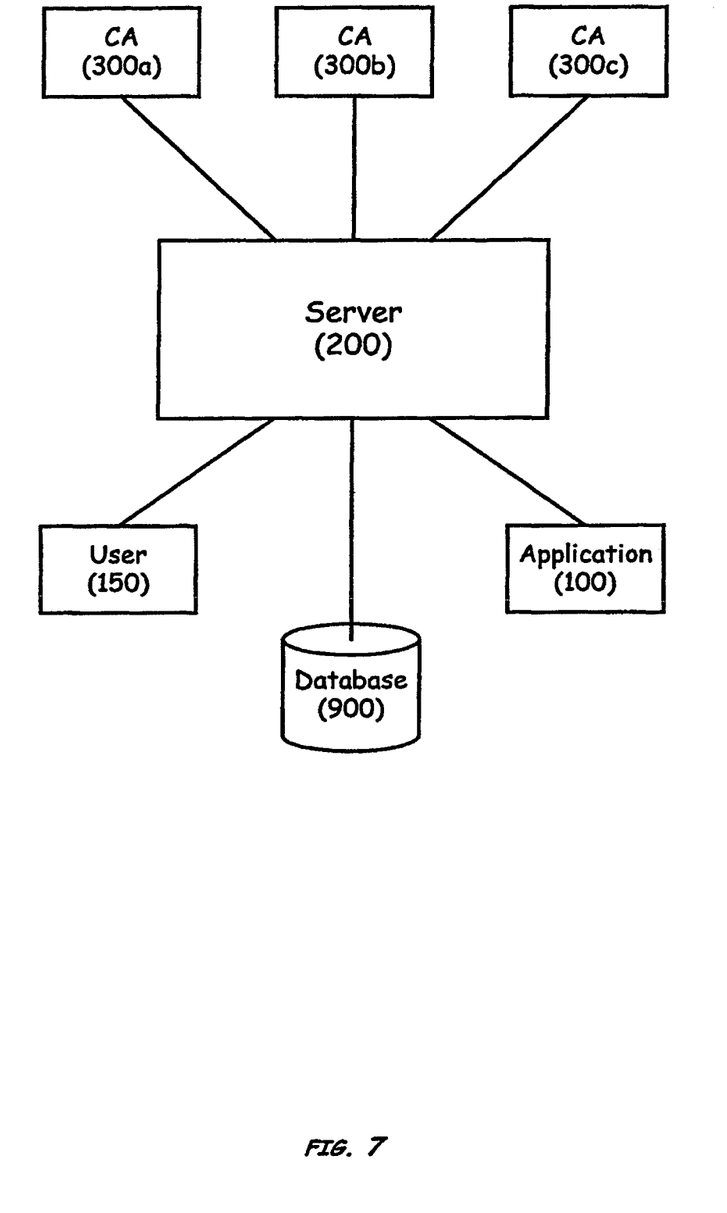
FIG. 7 is a schematic diagram of an embodiment showing an exemplary relationship between a server and other components, including a database.

Some embodiments of the present invention call for the use of databases, such as shown in FIG. 7. In this embodiment, a database 900 is coupled to a server 200. The database 900 may be used for storing information about the applications 100 or the users 150 or the CAs 300, or any other relevant or useful information which is required to be placed in a database for enhancing the capabilities of the middleware 500 or the server 200. In some embodiments, legacy systems may be coupled to the elements of the system. For example, legacy systems may be coupled to the application 100. This allows the application 100 to exchange information with older systems.

Certain other features become possible in a system incorporating a database 900. User 150 profiles and preferences, generally "user profile data," may be stored in a database 900 to accomplish additional customized goals. For example, a user 150 may conduct transactions with one or more CAs 300. In this case, the user 150 may only wish a certain subset of personal data or information about the user 150 or the user's accounts to be transferred to any particular CA. That is, the user 150 may wish to allow or block different pieces of information, which are known to the server 200 and kept in a database 900, from certain entities or CAs 300 in the outside world. As an example, a user 150 may have personal information relating to place of residence and employment history stored in a region of a relational database 900 associated with the user 150. The user 150 may not, however, wish information about his or her credit cards or financial accounts to be released to a particular entity. Similarly, a user 150 conducting an online retail transaction may wish to prevent the entity with which the retail transaction is being conducted from accessing other information (e.g., health records).

The database 900 is implemented in some cases as a relational database which may include user registration information therein. The database 900 may further include tables containing any or all of (1) properties data (e.g. user profile data), (2) application data and (3) privilege or permission data. Various embodiments of the present invention use the privilege data to make decisions about which property data can be accessed by which applications. Thus, rather than always permitting any participating application 100 to access any or all user data on the database 900, access control is provided to the user registry. The user 150 may in some embodiments specify which entities or applications 100 can access particular user data from the properties data. The permission or privilege data can be used to make determinations for access control using the user preference and the application data.

The role played by a registration authority (RA) is thus brought into light. According to some embodiments of the present invention, a user 150 or an application 100 may customize the way in which secure transactions are carried out by having one of many profiles or preference features enabled or disabled in their accounts, which may be kept on the server 200 or on the database 900. The RA may be implemented as part of the server 200 or the middleware 500, or may be implemented as an outside service, which may not be physically co-located with the server 200.

Figure 8:
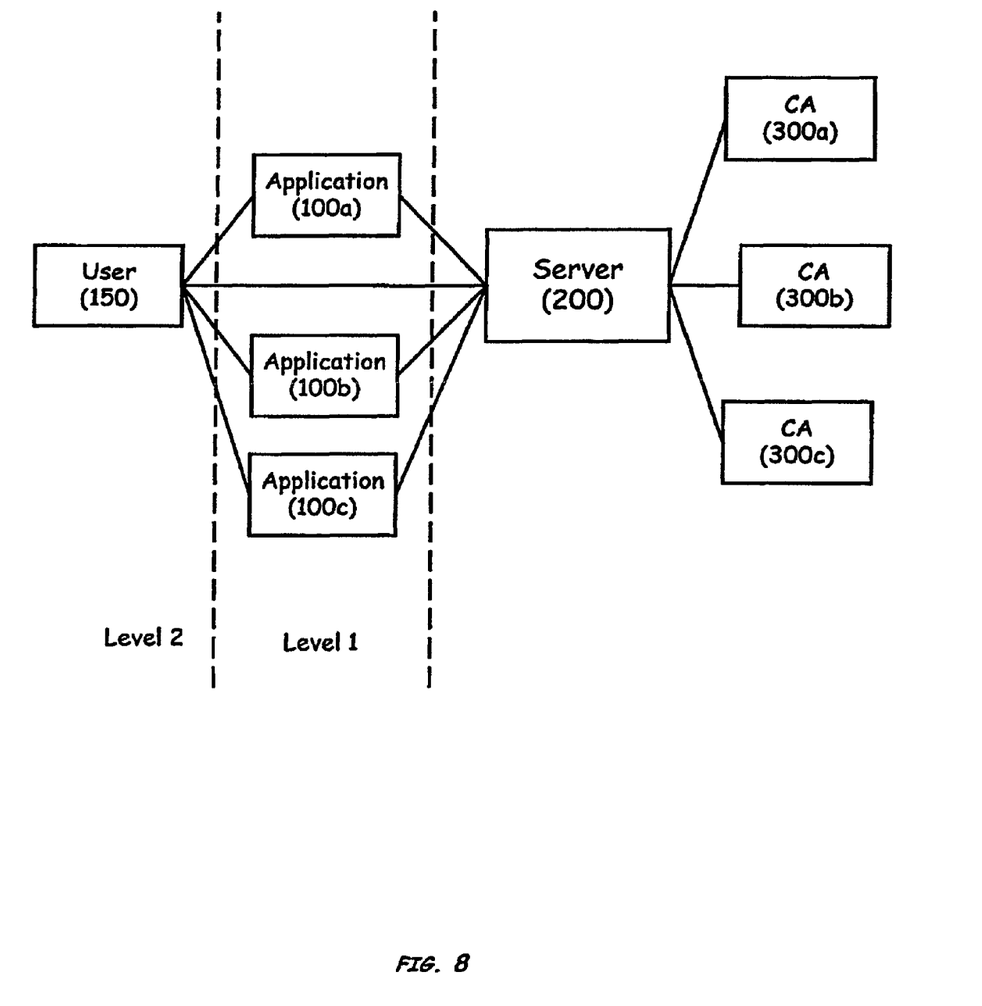
FIG. 8 is a schematic diagram showing a server coupled to a plurality of applications in a first level and to a user in a second level.

FIG. 8 shows a two-level paradigm for servicing users 150 and applications 100. In this embodiment, which is provided for the purpose of illustration of this concept, a first level (level 1) and a second level (level 2) are used. The user 150, who may be conceptualized as occupying a space in level 2, interacts with applications 100, which may be conceptualized as occupying space in level 1. The user 150 can also directly interact with the server 200. In this scenario, the user 150 may be an end user or a consumer or a citizen of a nation. The applications 100a-c may be institutions or establishments with which the user 150 interacts. For example, application 100a may be a university in which user 150 is enrolled, while application 100b may be an internal revenue service, and application 100c may be an online clothing outlet. Each of the applications 100 are coupled to the server 200 by one or more of the means described in this application. The server 200 is also coupled to one or more CAs 300 as described previously.

Figure 9:
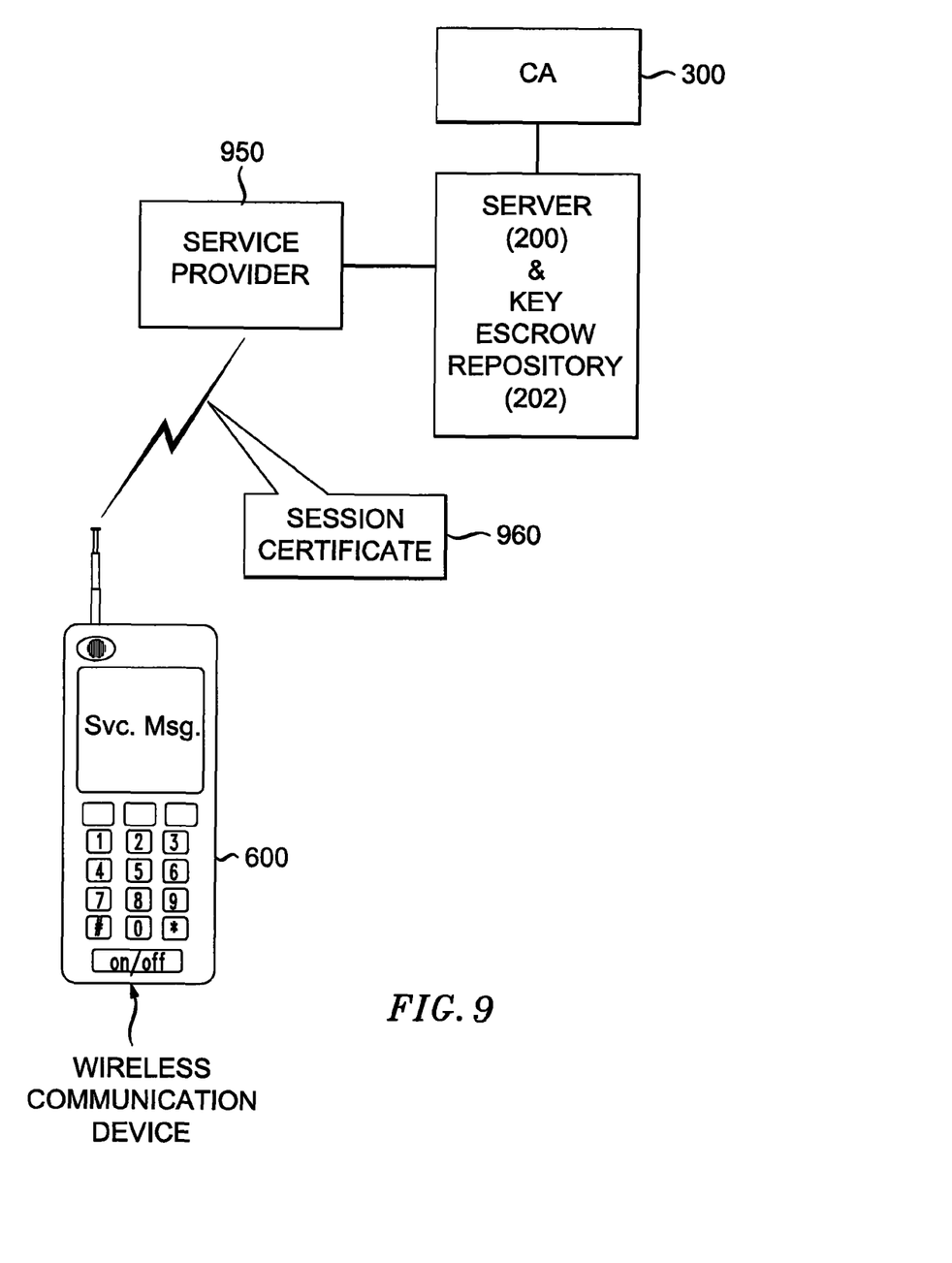
FIG. 9 is a schematic diagram of a server and key escrow repository coupled to a wireless communication service provider.

FIG. 9 shows an embodiment wherein a wireless communication device 600 is used to carry out a certification transaction. The wireless communication device 600 is coupled by a wireless connection to a service provider 950. A service provider 950 may be an Internet service provider or another portal that serves wireless communication devices such as wireless access protocol (WAP) telephones, personal digital assistants (PDAs) equipped with wireless modems, or other wireless devices. Once connected to the service provider 950, a "session" is established. Using the service provider 950 as a portal, the wireless communication device 600 may extend its reach to other devices coupled through communication networks to the service provider 950. In some embodiments, the service provider 950 may be used to connect the wireless communication device 600 to a server 200. The server 200 may contain a key escrow repository 202. The key escrow repository 202 may be implemented as a dedicated region of memory on the server 200, or may be in the form of a separate computer or database coupled to the server 200, or in other forms as the architecture may dictate in the specific application. A single-use session certificate 960 may be downloaded to the wireless communication device 600. This can be achieved by user 150 logging into the server 200, as described above, followed by the user requesting the session certificate 960.

The session certificate 960 may take the form of a data object, for example a session "cookie". For security reasons, the session certificate 960 may be designed to expire after a single use or upon termination of the particular session. Since wireless communications cannot generally be relied on to be as secure as other forms of communication, the use of a single-use session certificate 960 will avoid unauthorized users from reusing the session certificate 960 in a subsequent unauthorized session that may compromise the security of the authorized user 150.

In some embodiments the user 150, through the wireless communication device 600, logs into the server 200 using a Web-like interface, such as secure wireless Internet interfaces. According to other embodiments, the user 150 is required to utilize a hardware token that verifies the user's identity and establishes a secure connection with the server 200.

Figure 10:
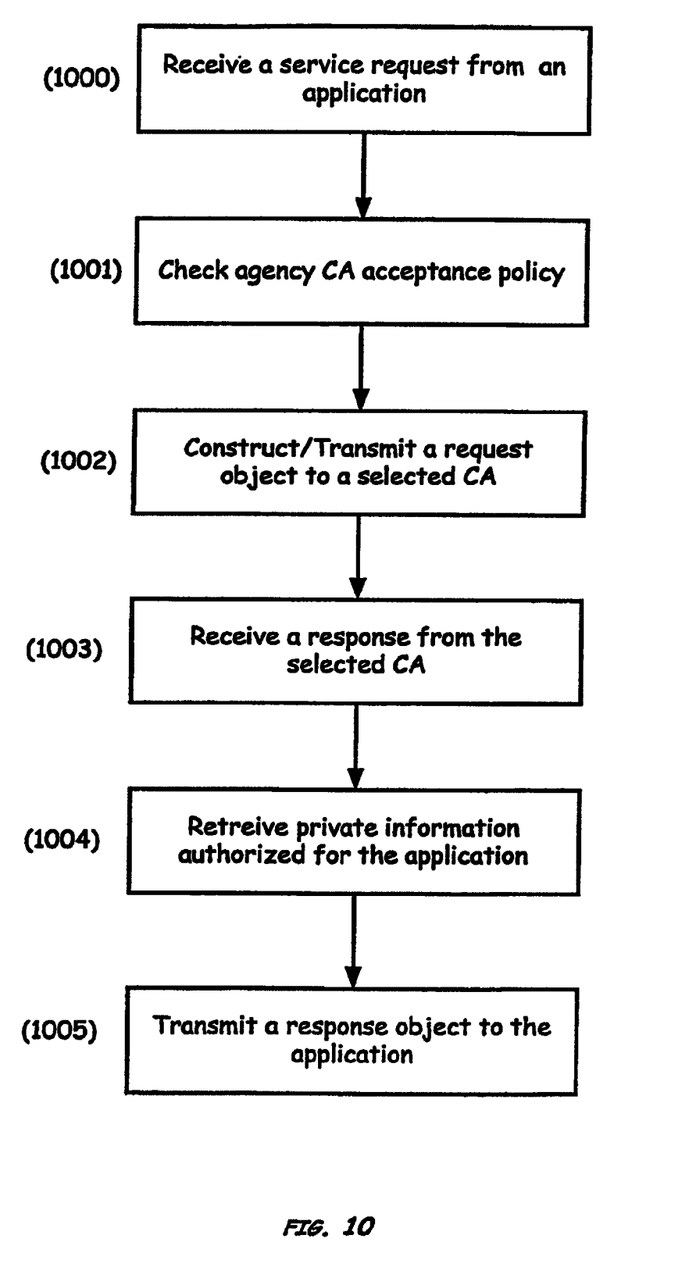
FIG. 10 shows a sequence of acts carried out according to one method for certification.

FIG. 10 shows one embodiment of a method for facilitating electronic certification according to the present invention. The acts presented may be carried out on a server 200, in middleware 500, or in a combination of both. We refer to the acts performed as though the acts were carried out by the server 200 for convenience only. It should be noted that the acts described in FIG. 10 are for illustrative purposes, and numerous other auxiliary acts may be carried out by a system in support of the overall process.

In act 1000, a server receives a service request from an application. In act 1001, the agency CA acceptance policy is checked. Normally act 1001 is carried out by the application policy manager 432 module. In act 1002, the server constructs and transmits a request object to a selected CA. The request object is typically formulated in a way to render it compatible with the selected CA and, in a preferred embodiment, comprises an object formatted according to the OCSP protocol.

A response is next received from the selected CA in act 1003. The response may also be in the OCSP format according to a preferred embodiment. Both the transmission and the reception of requests, request objects, responses, and response objects to and from the application or the selected CA are carried out according to one of many methods, some of which have been described previously. For example, transmission and reception of communication messages or objects to and from the server 200 may take place using the TCP/IP protocol, possibly over an Ethernet or a wireless communication connection.

Next, in act 1004, a database or data table is accessed for retrieval of private information authorized for the application. This act is normally carried out by the user policy manager 130 module.

Finally, the server transmits a response object to the application in act 1005. The response object sent to the application may be formatted to suit the application, and the format of the response object may be one of numerous formats, including in a format similar to that of the service request.

Figure 11:
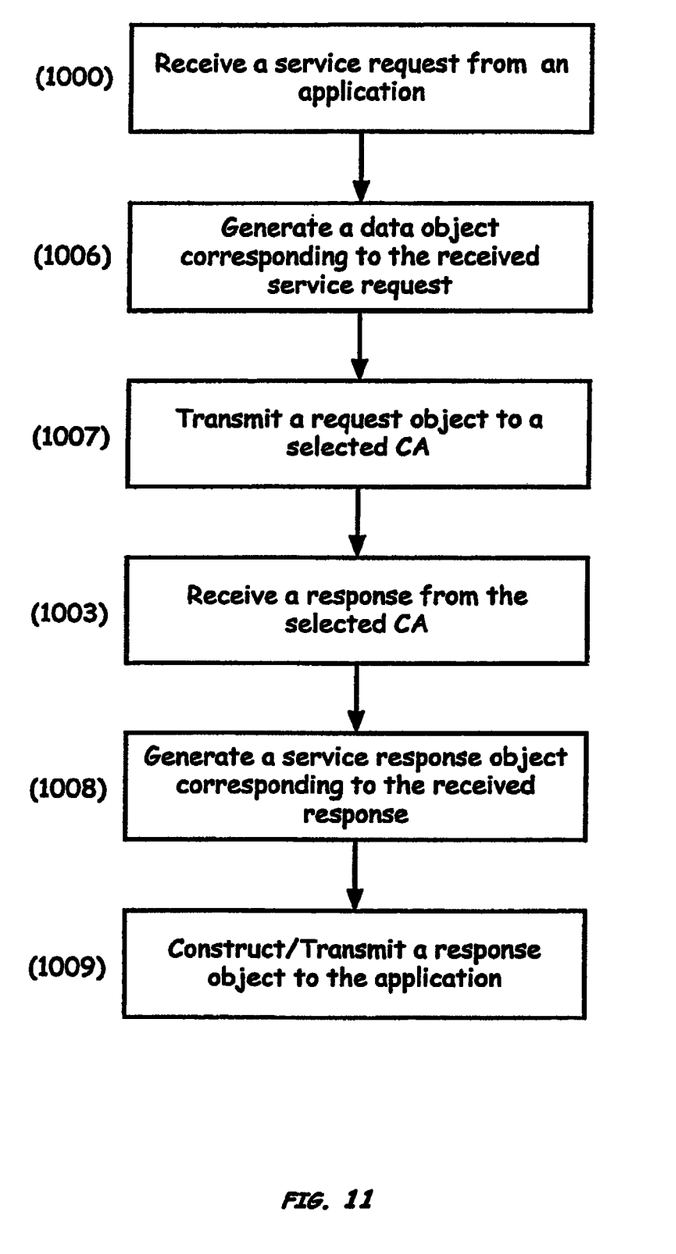
FIG. 11 shows another sequence of acts carried out according to an embodiment of a method for certification.

FIG. 11 shows yet another embodiment of a method for facilitating electronic certification according to the present invention. Act 1000 is carried out in a similar fashion to the act shown in FIG. 10, above, carrying the same reference numeral.

However, in FIG. 11, an act 1006 comprising generating a data object corresponding to the received service request is performed after receiving the service request from an application in act 1000. Generating the data object corresponding to the received service request may entail carrying out a number of auxiliary acts, each of which may be performed by a separate software module within the middleware 500. For example, generating the data object may comprise converting the service request from one format to another, followed by attaching extra information to the information received in the service request, such as application or user information obtained from a database. The act 1006 of generating the data object may further comprise packaging the data object into a compact object, such as by performing a data compression act on the data object prior to sending it to the selected CA. In act 1007, the server transmits a request object to a selected CA, following which, a response is received in act 1003 as before.

In act 1008, the server generates a service response object corresponding to the received response. Generating the service response object may entail carrying out a number of auxiliary intermediate acts, analogous to those described above in act 1006. For example, the received response may be unpacked or decompressed if it was received in a compressed format. The received response may also be converted from one data format to another according to one of numerous techniques known in the art.

Finally, in act 1009, a response object is constructed and transmitted to the application 100.

As in the case of all embodiments presented herein for the purpose of illustrating the concepts described by the present invention, these exemplary illustrations are not intended to limit the scope of the present application, which should be interpreted by the full scope of the accompanying claims. Further, the acts described above are not necessarily performed by the server 200 or middleware 500 alone. Some or all of the acts may be performed by auxiliary components, possibly coupled to the server 200 over a network.

Having now described a few embodiments of the invention, it should be apparent to those skilled in the art that the foregoing is merely illustrative and not limiting, having been presented by way of example only. Numerous modifications and other embodiments are within the scope of ordinary skill in the art and are contemplated as falling within the scope of the invention as defined by the appended claims and equivalents thereto.

What is claimed is:

1. A non-transitory computer-readable medium having instructions stored thereon, that in response to execution by a computing device causes the computing device to perform operations comprising:
    receiving, at a server, a service request from an application executing on a node separate from the server, the service request containing public key encryption data;
    based on user profile data, selecting a certification authority, from a plurality of available certification authorities, wherein the user profile data is pre-stored at the server and customizable based on user preference information;
    generating a data object including information associated with information in the service request;
    transmitting the data object from the server to the selected certification authority;
    receiving, at the server, a response from the selected certification authority;
    generating a response object including information associated with information contained in the response; and
    transmitting the response object to the application executing on the node.

2. The non-transitory computer-readable medium of claim 1, wherein the service request is certification authority-neutral.

3. The non-transitory computer-readable medium of claim 1, wherein generating the data object comprises converting the data object into a format consistent with an industry-standard protocol.

4. The non-transitory computer-readable medium of claim 3, wherein the industry-standard protocol is the Open Certificate Status Protocol (OCSP).

5. The non-transitory computer-readable medium of claim 1, wherein the operations take place in a public key infrastructure (PKI) environment.

6. The non-transitory computer-readable medium of claim 1, wherein the server is a World Wide Web server adapted for conducting secure transactions.

7. The non-transitory computer-readable medium of claim 1, wherein receiving the service request comprises receiving a HTTPS message from the application.

8. The non-transitory computer-readable medium of claim 1, wherein the response from the selected certification authority is in a format consistent with an industry-standard protocol.

9. The non-transitory computer-readable medium of claim 8, wherein the industry-standard protocol is the Open Certificate Status Protocol (OCSP).

10. The non-transitory computer-readable medium of claim 1, said instructions further causing the computing device to perform operations comprising posting an object to the server using a Post method.

11. The non-transitory computer-readable medium of claim 1, said instructions further causing the computing device to perform operations comprising passing the service request, using a load balancer, to a selected server, the server selected from a plurality of servers.

12. The non-transitory computer-readable medium of claim 1, wherein generating the response object comprises putting the response into a HTTP-compatible format.

13. The non-transitory computer-readable medium of claim 1, wherein the computing device is further operable to perform operations comprising registration of the application using a registration process.

14. The non-transitory computer-readable medium of claim 13, wherein the registration process comprises creating an application preference profile.

15. The non-transitory computer-readable medium of claim 1, wherein the transmitted data object comprises a subset of application-related information, the subset being chosen based on the selected certification authority.

* * * * *